July 9, 1940.  W. R. HILDEBRAND  2,207,619
WATER COOLING SYSTEM
Filed June 29, 1936
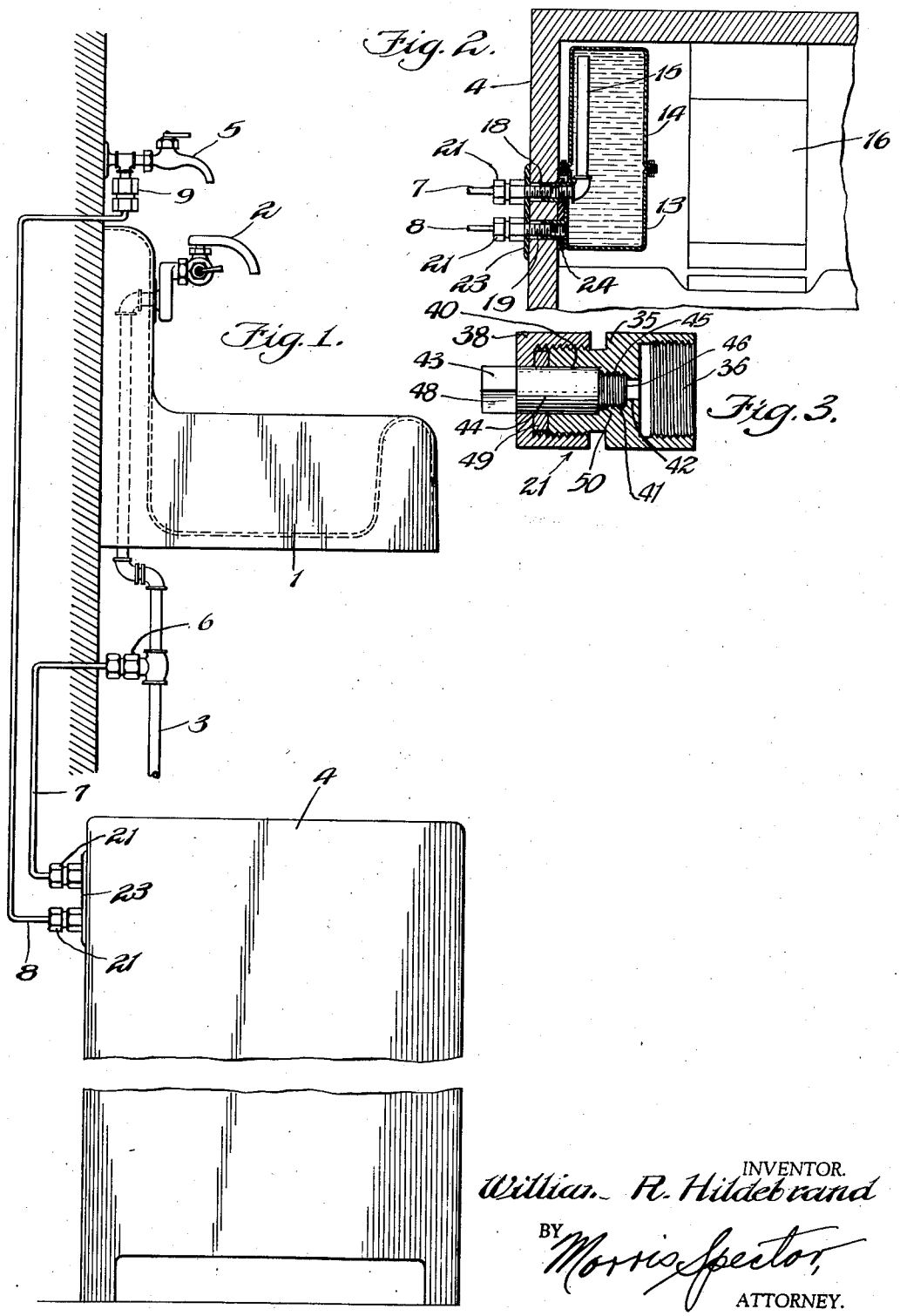
INVENTOR.
William R. Hildebrand
BY Morris Spector
ATTORNEY.

Patented July 9, 1940

2,207,619

UNITED STATES PATENT OFFICE 2,207,619

WATER COOLING SYSTEM

William R. Hildebrand, Chicago, Ill.

Application June 29, 1936, Serial No. 87,852

1 Claim. (Cl. 138—89)

This application is a continuation in part of my pending application Serial Number 659,471 filed March 3, 1933, issued as Patent No. 2,071,631 February 23, 1937.

This invention relates to water cooling systems, and more particularly to such systems as are adapted for domestic use, although not limited thereto.

It is one of the objects of the present invention to provide a simple and reliable water cooling system having a minimum number of parts and so arranged and constructed that the average layman can install the same in his home without the services of a plumber or the use of special tools.

It is a further object of the present invention to provide such a simple construction that no special skill is required of the operator in making the necessary connections to install the water cooling system.

An important part of the present invention comprises a plug-in connector adapted to be connected to a pipe or the like and constitute a leak-proof closure for the pipe and so arranged that it can receive a connecting pipe in a simple and expedient manner whereby connections may be made without requiring special apparatus or parts. The connector is provided with a sealing gasket so arranged that it seals against the plug prior to the establishing of pipe connections through the connector and wherein the same gasket seals against a connecting pipe when a connecting pipe is used.

The attainment of the above and further objects of the present invention will be apparent from the following specification taken in conjunction with the accompanying drawing forming a part thereof.

In the drawing:

Figure 1 is a diagrammatic view of a system embodying the principles of my invention;

Figure 2 is a fragmentary sectional view through a portion of a refrigerator showing the location of the cooling container within the refrigerator; and Figure 3 is a sectional view through a connecting coupling for the pipes in the system of Figure 2.

Reference may now be had more particularly to Figure 1. In this figure I have shown at 1, a sink which may be of the type ordinarily found in domestic kitchens for providing hot and cold running water. The usual mixing faucet is indicated at 2, and the tap water inlet pipe indicated at 3. The sink, with its faucet, and the tap water pipe 3 may be of any standard construction known in the art. At 4 I have indicated a refrigerator which may also be of any standard or preferred construction. At 5 is shown a faucet for supplying refrigerated water. This faucet is mounted in a position convenient to the user of the kitchen sink, in the present instance immediately above the same. At 6 is indicated a coupling for receiving tap water, said water passing through the coupling, and through an inlet pipe 7 to a container within the refrigerator. An outlet pipe 8 extends from the container within the refrigerator to the cold water faucet. The outlet pipe 8 is connected to the faucet 5 by a coupling 9 of a construction like that of the coupling 6 and illustrated more fully in Figure 5. It is thus apparent that tap water will flow from the inlet pipe 3, through the coupling 6 and inlet pipe 7, to the container within the refrigerator where it is cooled, thence through the outlet pipe 8 to the faucet 5. It is to be noted that the lower end of the inlet pipe 7 is above the lower end of the outlet pipe 8. This means that the warmer tap water enters the container within the refrigerator at a point above the outlet, preferably adjacent to the top of the container. The colder water within the container naturally gravitates to the bottom of the container where the outlet is located so that only the coldest water is withdrawn from the container.

In Figure 2 I have shown an enlarged fragmentary view of a portion of the refrigerator to illustrate the location of the container within the refrigerator. The container comprises two parts, indicated at 13 and 14, suitably secured together, a gasket being interposed between the two parts to seal against leakage. An inlet pipe 15 extends from the inlet coupling to a point adjacent the top of the container 14 so that the inlet tap water always enters the container adjacent the very top thereof. The outlet from the container is adjacent the bottom thereof so that the water entering the container gravitates slowly towards the outlet as the water is cooling. The container of Figure 2 is secured to the side wall of the refrigerator, adjacent the cooling unit 16. A pair of short nipples 18 and 19 communicate, respectively, with the inlet and outlet sides of the container 14 and terminate in combined closure plugs and coupling members 21—21 which are of a construction similar to that of the coupling members 6 and 9, and more fully illustrated in section in Figure 3. A cover plate 23 is provided at the back of the refrigerator. The inlet and outlet nipples 18 and 19 extend through the cover plate which may bear suitable inscription reading "Inlet" and "Outlet." The closure couplings 21—21 are provided with plugs and are so arranged and constructed that a pipe connection can be made thereat by merely loosening a nut, removing the plug, forcing an unthreaded pipe into the coupling and then tightening the nut, as will be more fully explained as this description proceeds.

The area of the portion of the container 13 that bears against the wall of the refrigerator is preferably quite large. A slightly adhesive washer 24, preferably of rubber, is interposed between the container and the wall of the refrigerator. This washer, of course, is provided with suitable openings through which the nipples 18 and 19 pass. The nipples and the associated coupling members 21, serve to hold the container effectively in place, notwithstanding the weight of the contents of the container.

If the container is installed in the refrigerator at the factory, and the refrigerator is to be used in a home where a third faucet is not immediately supplied, the closure plugs in the coupling members 21, (to be presently described) maintain the container sealed against the ingress of warm air and egress of cold air therethrough which would otherwise serve to increase the load on the refrigerator. Thereafter when a third faucet such as the faucet 5 is to be installed, it is merely necessary to plug in the pipes 7 and 8 into the coupling members.

Reference may now be had more particularly to Figure 3 showing the construction of the coupling nipple 21. The coupling nipple 21 comprises a member 35 internally threaded at the end 36 so that it may be threaded over the nipple 18 or 19, or to a T fitting connected to the faucet 5, and externally threaded at its opposite end for receiving an internally threaded cap 38. The cap 38 and the member 35 are each of hexagonal formation to facilitate gripping of the same by means of a wrench or the like. One end of the member 35 is provided with a smooth cylindrical bore 40 terminating in a reduced threaded portion 41 and a still further reduced bore 42. A plug 43 is provided, said plug having a smooth cylindrical shank 44 that fits into the bore 40, and provided with a reduced threaded end portion 45 that screws into the pipe threads 41. The end 46 of the plug 43 closes the bore 42 and thus prevents the escape of fluid from the end 36 through the coupling. The end 48 of the plug 43 is of a non-circular section to facilitate gripping of the same by means of a wrench, so that it may be tightened in the threaded portion 41. A gasket 49, of rubber or the like, is compressed axially by the cap 38 against the end of the member 35, and thus expanded radially into firm pressure engagement with the shank 44 of the plug 43. The gasket thus prevents any leakage through the opening 42, past the threads 45, and along the cylindrical bore 40. If it is desired to establish a pipe connection with the coupling, at the left hand thereof, as seen in Figure 3, the cap 38 is loosened to relieve the pressure on the gasket 49, then the plug 43 is threaded out of engagement with the threads 41 and entirely removed. A smooth walled blocked tin pipe, such as the pipes 7 and 8, may then be inserted in place of the plug 43 so that the pipe terminates at the point 50 in the member 35. It is to be noted that the pipe does not thread into the threads 41, since an unthreaded pipe may be used, the pipe being merely pushed into the coupling member. Thereafter the cap 38 is tightened to exert an axial pressure on the gasket 49 and thus expand the same radially into intimate sealing engagement with the periphery of the inserted pipe and form a liquid tight seal with the pipe and prevent any leakage along the bore 40 and along the outside of the pipe. The coupling member 21 is provided in the inlet pipe 3, at the point indicated at 6, the end 36 of the coupling member being the liquid receiving end thereof, and the opposite end being the end that receives the blocked tin pipe 7. This same type of coupling member 21 is threaded on the nipples 18 and 19 when the cold water container is installed in the refrigerator and before the piping connections are made thereto. The gasket 49 provides a convenient means for sealing the inlet and outlet pipes in the coupling member after they are inserted in place. Likewise as to the coupling member 6, it may be provided in the inlet pipe at the time of installation of the sink 1, being provided with the plug 43 to prevent outer leakage of the tap water. The coupling is therefore available for future use in the event that it is desirable to establish cooling water connections in the manner above set forth. Such connections may then be made by the average layman without using special tools, or without requiring the services of a plumber. The pipes 7 and 8 are, preferably, made of blocked tin, which means that they are flexible. By reason of the flexibility a layman can bend the same without using special tools, in order to extend the connection from the faucet to the refrigerator, or from the source 6 to the refrigerator. If at any time it should be desired to change the connections, or to dispense with the connections, either permanently or temporarily, it is merely necessary to turn off the water temporarily, loosen the caps 38, remove the inlet and outlet pipes 7 and 8 and replace each with a plug, such as the plug 43, the gaskets 39 being left in the coupling.

In compliance with the requirements of the patent statutes I have here shown and described a few embodiments of my invention. It is, however, to be understood that the invention is not limited to the precise constructions here shown, the same being merely illustrative of the principles of the invention. What I consider new and desire to secure by Letters Patent is:

A plug-in pipe coupling comprising a connector having means at one end for joining it to a pipe, and having a cylindrical bore at its opposite end, a plug fitting closely in said bore for closing the same, a gasket surrounding the plug and bearing against the connector, said gasket being of material that expands radially when compressed axially, a cap having threaded engagement with the connector and having an opening in alignment with the bore, said plug extending through said opening, said cap compressing the gasket axially to expand the same radially into engagement with the plug, said plug having threaded engagement with the connector and being held against turning by the pressure of the gasket thereagainst whereby the plug may be removed after loosening the gasket pressure by loosening the cap on the connector.

WILLIAM R. HILDEBRAND.